(12) United States Patent
Munguia et al.

(10) Patent No.: US 7,234,051 B2
(45) Date of Patent: Jun. 19, 2007

(54) METHOD AND APPARATUS FOR BOOTING FROM A SELECTION OF MULTIPLE BOOT IMAGES

(75) Inventors: Peter R. Munguia, Chandler, AZ (US); Kyle D. Gilsdorf, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 10/215,605

(22) Filed: Aug. 9, 2002

(65) Prior Publication Data

US 2004/0030883 A1 Feb. 12, 2004

(51) Int. Cl.
*G06F 15/177* (2006.01)
*G06F 11/00* (2006.01)

(52) U.S. Cl. .................. 713/2; 713/1; 714/36

(58) Field of Classification Search .............. 713/2, 713/1, 100; 714/1, 8, 23, 36; 710/15; 717/127
See application file for complete search history.

(56) References Cited

U.S. PATENT DOCUMENTS 6,125,390 A * 9/2000 Touboul ............... 709/223
6,446,203 B1 * 9/2002 Aguilar et al. ............. 713/2
6,473,856 B1 * 10/2002 Goodwin et al. ........... 713/2
6,631,468 B1 * 10/2003 von Below ................. 713/2
6,754,818 B1 * 6/2004 Lee et al. ................... 713/2
6,907,523 B2 * 6/2005 Patel ....................... 713/100

FOREIGN PATENT DOCUMENTS

JP 11296355 A * 10/1999

OTHER PUBLICATIONS

IBM, Boot path selection veification and override, Feb. 1999, Research Disclosure Journal, pp. 3.*

* cited by examiner

*Primary Examiner*—Chun Cao
*Assistant Examiner*—Suresh K Suryawanshi
(74) *Attorney, Agent, or Firm*—Philip A. Pedigo

(57) ABSTRACT

A method and apparatus for booting from a selection of multiple boot images. Control logic is coupled with a plurality of memory devices containing a plurality of boot images. The control logic employs a device select value to map device requests to memory devices. An event agent monitors the apparatus for various events including a corrupted primary boot image. The event agent notifies the control logic when an event occurs and the control logic changes the device select value responsive to the event. The mapping from device requests to memory devices changes when the device select value changes.

12 Claims, 10 Drawing Sheets

FIG. 7A  FIG. 7B

METHOD AND APPARATUS FOR BOOTING FROM A SELECTION OF MULTIPLE BOOT IMAGES

TECHNICAL FIELD

Embodiments of the invention relate to improving the reliability of computing devices. More particularly, specific embodiments of the invention relate to improving access to a selection of multiple boot images.

BACKGROUND

Booting (or the boot process) is the process of starting a computing device from a halted or powered-down condition. A computing device can be a mainframe computer, desktop computer, laptop computer, personal digital assistant, server, client, router, switch, or similar device. The term "system" is used as a shorthand for a computing device or part of a computing device.

When a computing device is first switched on (or reset), its volatile memory (e.g., main system memory) is empty. Computing devices, therefore, are typically designed to access a fixed range of addresses in non-volatile memory for instructions and data that assist the computing device in the boot process. Non-volatile memory includes read-only memory (ROM), erasable programmable read-only memory (EPROM), electrically erasable programmable read-only memory (EEPROM), flash memory, and the like.

Flash memory is a type of EEPROM in which each flash memory device is divided into one or more memory banks. Flash memory functions more quickly than other types of EEPROM because data is written into or erased from flash memory devices bank-by-bank rather than one byte at a time. All of the data within a bank is erased when data is written into any region within that bank.

Bootable information is information that a computing device uses during the boot process and is specific to the operating system used by the computing device. Typically, bootable information includes one or more of a master boot record, a boot record, file allocation tables, a root directory, a table of descriptors, a boot catalog directory, system configuration files and the like. Bootable information can include both data and instructions. A boot image is a collection of bootable information that enables a computing system to complete the boot process. Computing devices sometimes store a primary boot image and an alternate boot image in the same bank of a flash memory device.

FIG. 1 is a block diagram of conventional chip select system 100 that is suitable for use by a computing system during the boot process. Chip select system 100 includes memory devices 102–108, 2 to 4 decoder 110, and address lines A0–A3. Memory devices 102–108 are flash memory devices each having a single bank of memory. For illustrative purposes, memory devices 102–108 are each capable of containing four words of data or instructions. A person of ordinary skill in the art will recognize that the number of address lines and the size of the memory devices can be varied to suit the needs of different computing devices.

Since each memory device 102–108 only contains four words of data/instructions, each device only needs two address lines. Therefore, address lines A0 and A1 are connected to memory devices 102–108. The four words within memory devices 102–108 are selected by the addresses XX00, XX01, XX10, and XX11, wherein X stands for either 1 or zero. Address lines A2 and A3 are connected to 2 to 4 decoder 110 and are used to select one of the four memory devices. For example, memory device 102 can be selected with address 00XX and memory device 108 can be selected with address 11XX.

During the boot process, conventional computing devices decode fixed addresses to access bootable information in non-volatile memory. For example, a computing device may decode fixed addresses 0000 to 0011, range_A, to access bootable information. When $range_{13}A$ is decoded, chip select system 100 selects memory device 102. If the bootable information in memory device 102 is corrupted, then the computing device may not successfully boot.

Conventional computing devices typically store all bootable information within a single memory bank of a flash memory device. For example, a conventional computing device may store two boot images in the single memory bank of flash memory device 102. The computing device may use a software flag to select which boot image is accessed by inverting address lines A0 and A1. During an initial boot process, for example, 0001 may be accessed for bootable information. If an error occurs, the software flag is set and, during the subsequent boot process, 0010 is accessed for bootable information. Both boot images are vulnerable when, for example, flash memory device 102 is written to, because flash memory is written on a bank-by-bank basis.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description various aspects of the invention, a method and apparatus for booting from a selection of multiple boot images, are described. Specific details will be set forth in order to provide a thorough understanding of the invention. It will be apparent, however, to those skilled in the art that the invention may be practiced with only some or all of the described aspects of the invention, and with or without some or all of the specific details. In some instances, well-known architectures, steps, and techniques haven not been shown to avoid unnecessarily obscuring the invention. For example, specific details are not provided as to whether some aspects of the method and apparatus are implemented as software routines, hardware circuits, firmware, or a combination thereof.

Figure 1:
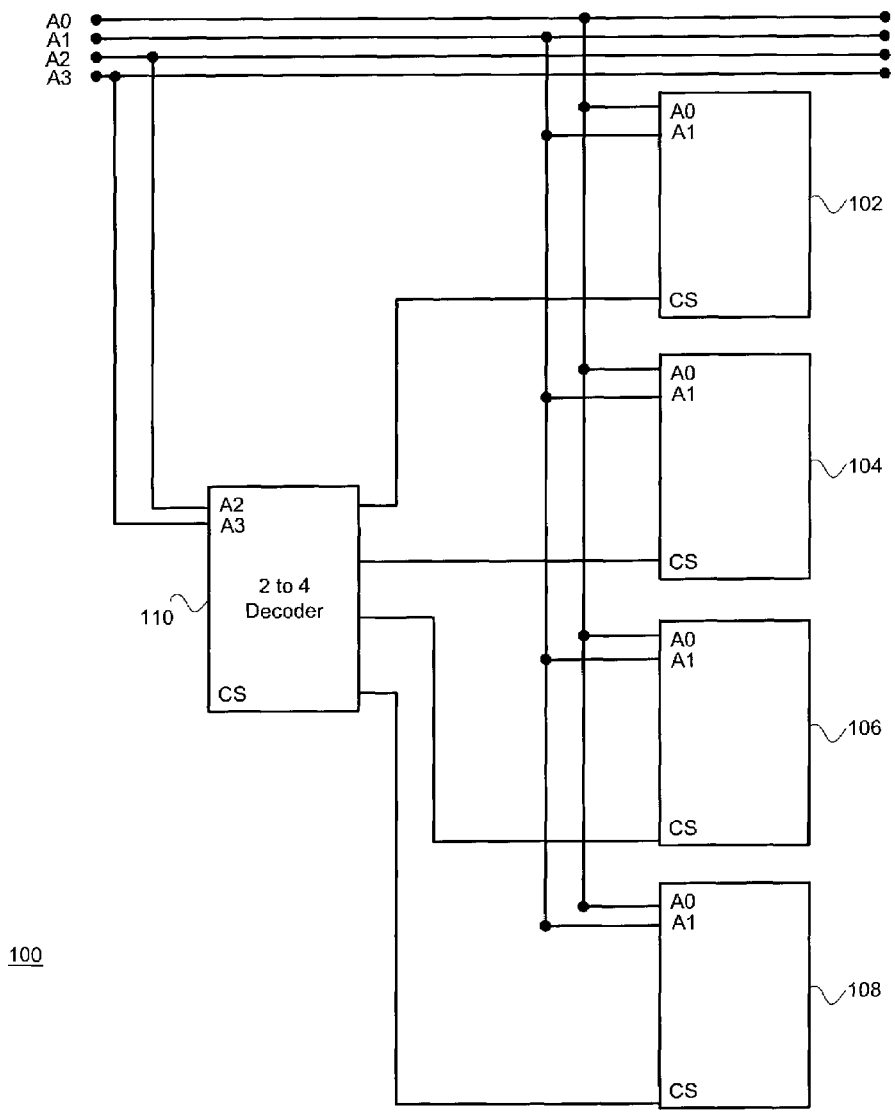
FIG. 1 is a block diagram of conventional chip select system 100 that is suitable for use by a computing system during the boot process.
Figure 2:
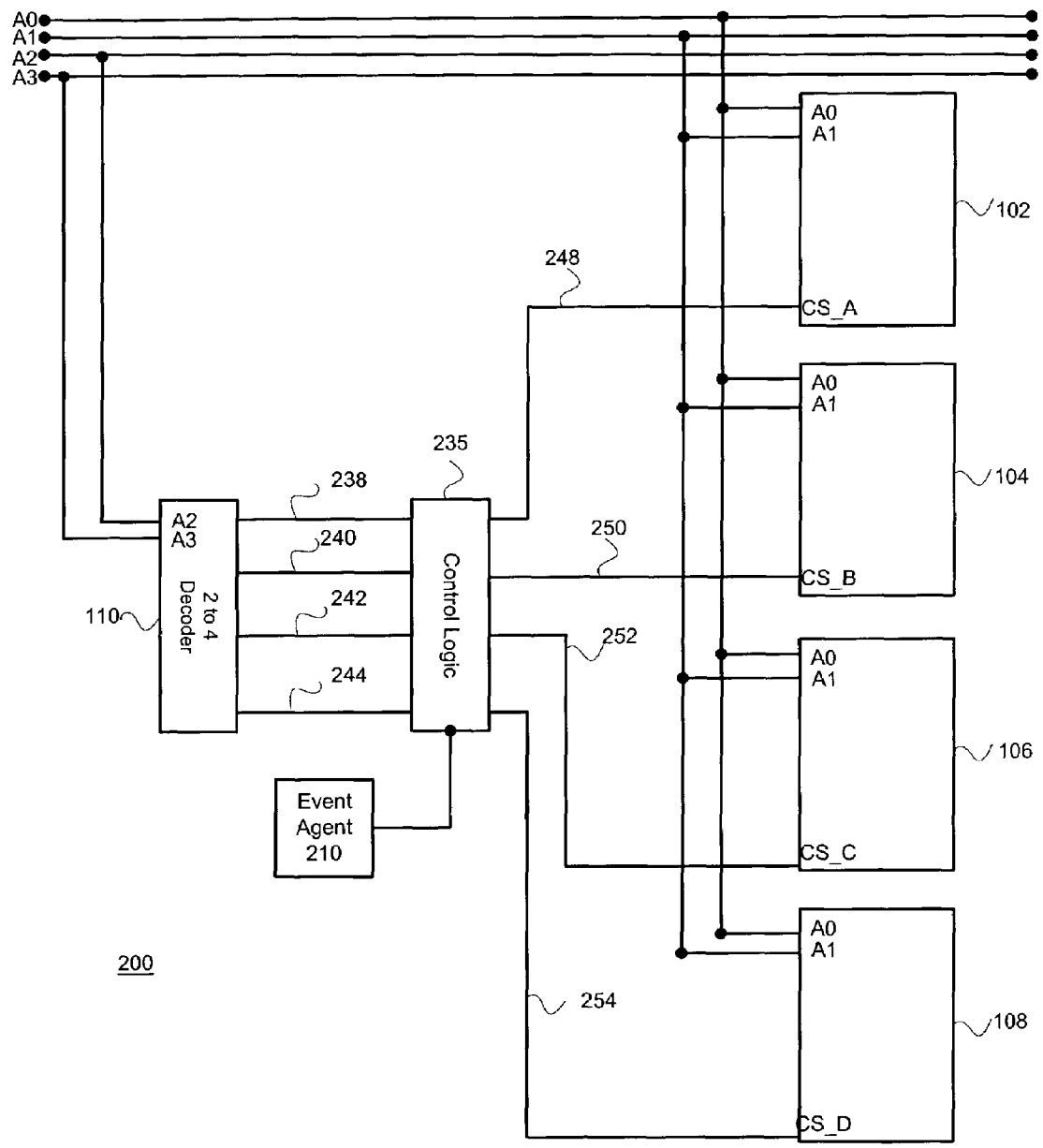
FIG. 2 is block diagram of chip select system 200 structured in accordance with certain aspects of the invention.

FIG. 2 is block diagram of chip select system 200 structured in accordance with certain aspects of the invention. Some elements of chip select system 200 are similar to elements in chip select system 100 and those elements are similarly numbered. In addition, chip select system 200 contains control logic 235 and event agent 210. The outputs of 2 to 4 decoder 110 are inputs to control logic 235 and are subsequently referred to as device request inputs 238–244 or simply device requests 238–244. The outputs of control logic 235 are used to select memory devices 102–108 and are subsequently referred to as device select signals 248–254 or simply device selects 248–254. Event agent 210 is described below in connection with FIGS. 6–8.

Control logic 235 maps device requests 238–244 to device selects 248–254, according to an embodiment of the invention. The mapping is based on device select values stored in a memory that is preserved through a reset, such as, battery backed or non-volatile memory. Battery backed memory and non-volatile memory are well known in the art and will not be further described except as they pertain to the claimed invention. Device select values can be implemented in many ways including control bits, counter values, shift registers, light emitting diodes (LED), and other digital indicator devices.

Figure 3A:
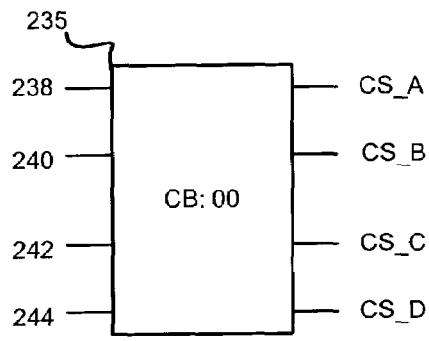
FIGS. 3A–3D illustrate certain aspects of the invention when device select values are implemented with control bits (CB) 00, 01, 10, and 11.
Figure 3B:
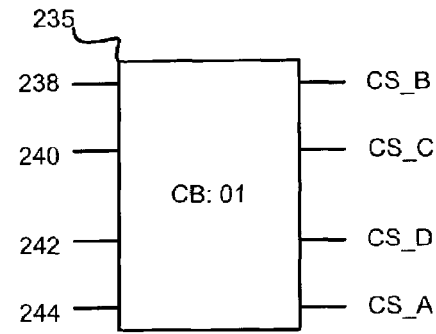
Figure 3C:
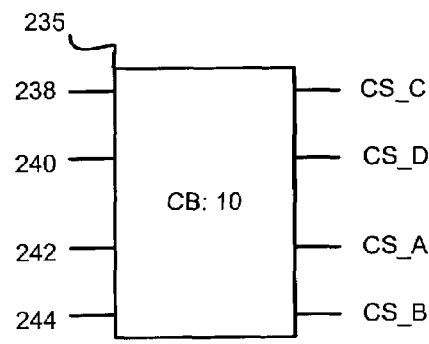
Figure 3D:
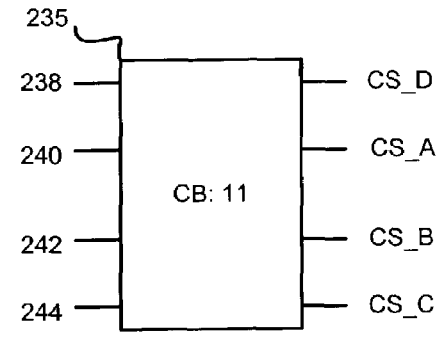

FIGS. 3A through 3D illustrate certain aspects of the invention when device select values are implemented with control bits (CB) 00, 01, 10, and 11. Initially, the control bit is equal to 00 and device request 238 maps to device select CS_A. As the control bit increments, however, the mapping of device requests to device selects rotates. In FIG. 3B, for example, device request 238 maps to device select CS_B. In FIG. 3D, the control bit has incremented to 11 and device request 238 maps to device select CS_D. The number of device requests and device selects is not limited to four but can be any number. Also, the control bit is not limited to simply incrementing by one but can increment by any number, decrement by any number, or assume a predetermined value. Similarly, the changes in how device requests map to device selects are not limited to shifting by one but can shift by any number or assume a predetermined value.

Referring again to FIG. 2, an exemplary description of the operation of certain aspects of the invention is described. In one embodiment of the invention, bootable information (e.g., a boot image or a portion of a boot image) is stored in memory devices 102–108. During an initial boot process, a computing device decodes a fixed address (e.g., device request 238) to access bootable information. The control bits have an initial value (e.g., 00) and device request 238 maps to device select 248. Event agent 210, which is more fully described below, detects an event that interferes with the boot process (e.g., corrupted bootable information in memory device 102). The computing device is reset and the control bit is incremented to 01 (or any other value).

During the subsequent boot process, the fixed address is decoded, again, to produce device request 238. Since the control bit has been incremented to 01, device request 238 maps to device select 250. Thus, the computing device performs the boot process based on the bootable information stored in memory device 104. The process of changing the control bits, and thereby changing the mapping between device requests and memory devices, can continue any number of times.

Figure 4A:
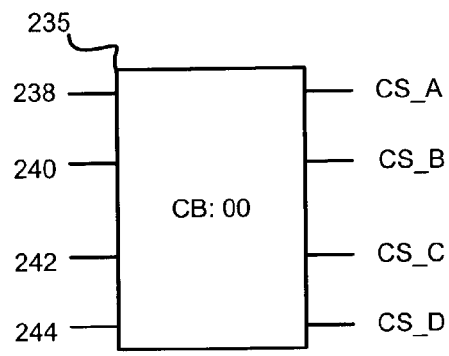
FIGS. 4A–4D illustrate an alternate embodiment of the invention in which mapping between device requests and device selects is configurable.
Figure 4B:
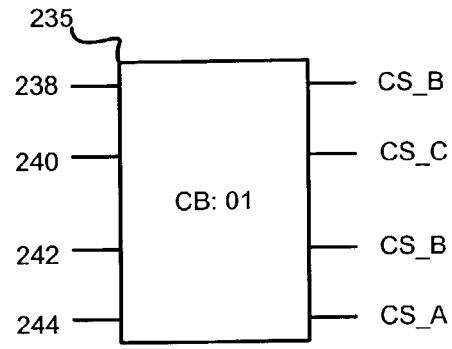
Figure 4C:
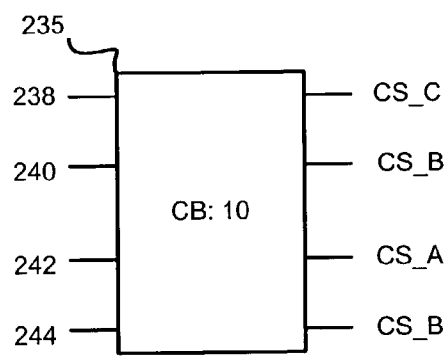
Figure 4D:
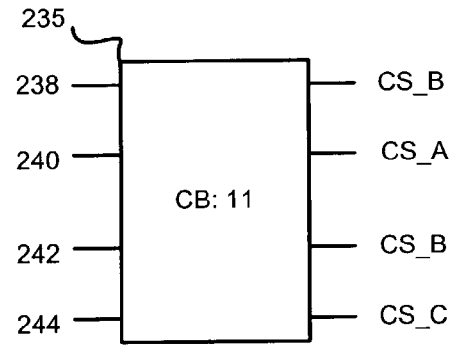

FIGS. 4A through 4D illustrate an alternate embodiment of the system in which mapping between device requests and device selects is configurable. In FIG. 4A, device request 238 is configured (e.g., by the user of the computing device) to map to device select CS_A, when the control bit is equal to 00. Similarly, FIGS. 4B and 4D illustrate that device request 238 is configured to map to device select CS_B, when the control bit is either 01 or 11. In one embodiment of the invention, the configuration selection is stored with the control bits in battery backed memory, non-volatile memory, or the like.

Figure 5:
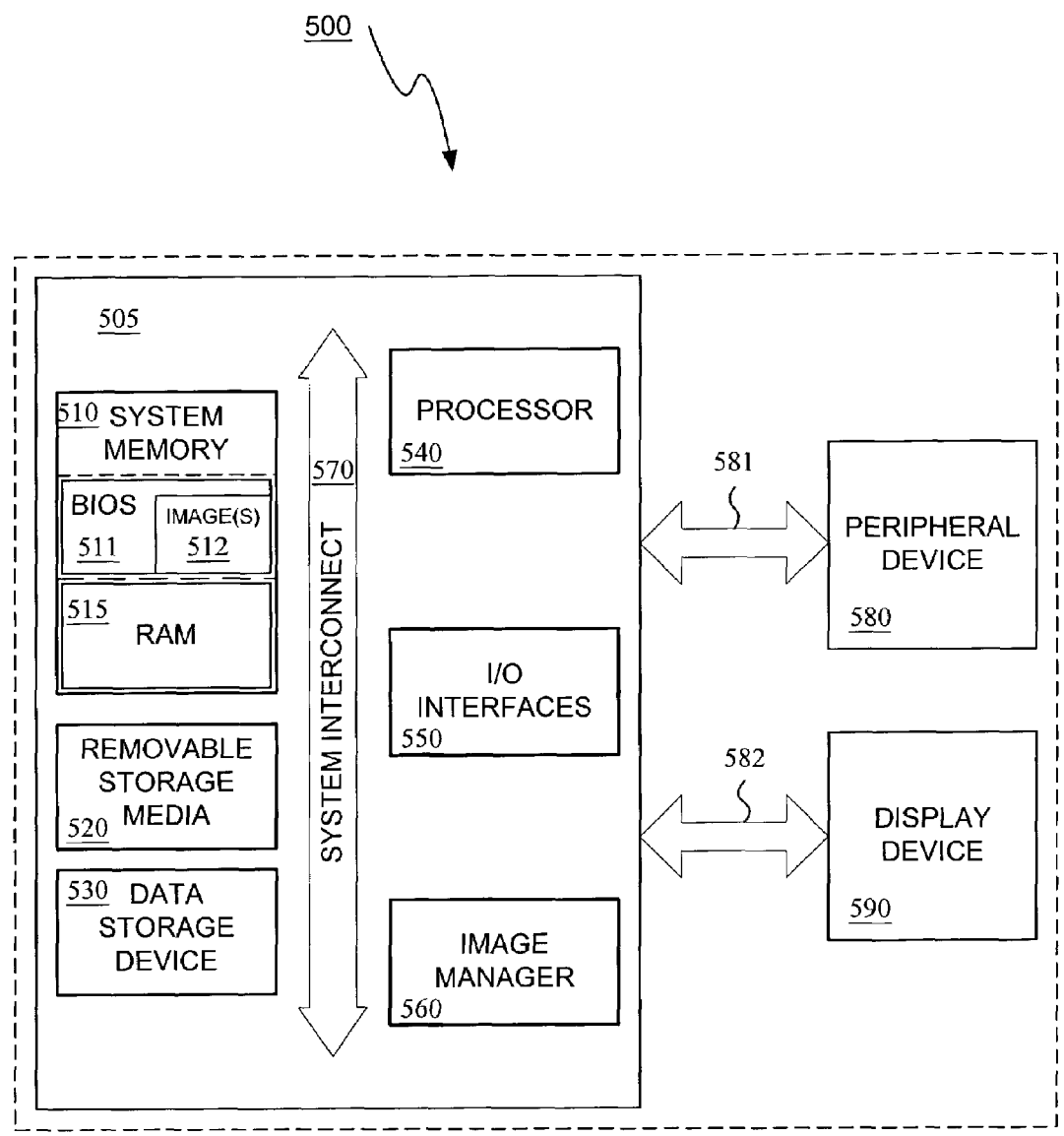
FIG. 5 illustrates computing system 500 in which an embodiment of the invention is implemented.

FIG. 5 illustrates computing system 500 in which an embodiment of the invention is implemented. Computing system 500 includes general purpose computing device 505 with system memory 510, removable storage media 520, a data storage device 530, one or more processing units 540, input/output (I/O) interfaces 550, image manager 560, and system interconnect 570. Computing system 500 may also include display device 590 and one or more peripheral devices 580.

Image manager 560 controls access to boot image(s) 512. Image manager 560 may include a chipset, control bits, firmware, and other control logic that enables image manager 560 to access boot image(s) 512 during a boot process. A boot process includes system start-up, a cold boot (e.g., powering on a system), a reboot, a reset, a system initialization, reloading system components and modules, and other similar routines. Embodiments of image manager 560 will be described in greater detail in FIGS. 6–8.

System memory 510 may encompass a wide variety of memory devices, including ROM, EPROM, EEPROM, random access memory (RAM), non-volatile random access memory (NVRAM), cache memory, flash memory, and other memory devices. System memory 510 may store program modules such as routines, programs, objects, images, data structures, program data, and other program components that perform particular tasks or implement particular abstract data types that facilitate system use.

System memory 510 may include basic input/output system (BIOS) 511. In some embodiments of the invention, BIOS 511 stores boot image(s) 512 and basic routines that initialize and facilitate the transfer of information between elements of computing system 500. Exemplary embodiments of the invention include an image manager 560 that accesses one or more of boot image(s) during a boot process.

Data storage device(s) 530 includes one or more hard disks (or other magnetic disks), flash memory devices, or other memory device(s). Removable storage media 520 may include floppy disks, ZIP disks, other magnetic disks, compact disks (CD-ROM), digital versatile/video disks (DVD), other optical storage media, flash memory devices, and other removable system-readable media that store instructions and/or data. In some embodiments of the invention, boot image(s) 512 are stored in data storage device(s) 530 and/or removable storage media 520. Also boot images 512 can be stored on any combination of system memory 510, removable storage 520, and data storage device(s) 530. In one embodiment of the invention, for example, image manager 560 initially attempts to boot from a boot image 512A residing in BIOS 511, detects an event, and subsequently boots from a boot image 512B (not necessarily identical to 512A) stored in removable storage media 520.

One or more processing devices 540 may include a microprocessor, microcontroller, field programmable gate array (FPGA), application specific integrated circuit (ASIC), central processing unit (CPU), and similar devices that access instructions from system storage (e.g., system memory 510, removable storage media 520, or data storage devices 530), decode them, and execute those instructions, performing arithmetic and logical operations. Computing system 500 may also include one or more I/O interfaces 550. I/O interfaces 550 may include a hard disk drive interface, a magnetic disk drive-interface, an optical drive interface, a parallel port, serial port, universal serial bus (USB) port, a display device interface (e.g., video adapter), a network interface card (NIC), a sound card, modem, and the like.

System interconnect 570 permits communication between the various elements of computing system 500. System interconnect 570 may include a wide variety of signal lines including one or more of a memory bus, peripheral bus, local bus, host bus, bridge, optical, electrical, acoustical, and other propagated signal lines. Peripheral devices 580 may include printers, scanners, speakers, keyboards, keypads, pointing devices, and other similar devices. Display devices 590 may include one or more monitors, LCD screens, projectors, and other similar devices. Peripheral devices 580 and display devices 590 may connect to the rest of computing system 500 through interconnects 581 and 582.

System 500 may include additional components and also may omit some of the components shown in FIG. 5. A person of ordinary skill in the art appreciates that computing system 500 may encompass a wide variety of computing systems including personal computers, servers, network processing units (NPU), network switches, handheld devices, multi-processor systems, microprocessor-based or programmable consumer electronics, network PCs, mini-computers, mainframe computers, personal digital assistants, digital cameras, calculators, and other digital devices.

Figure 6:
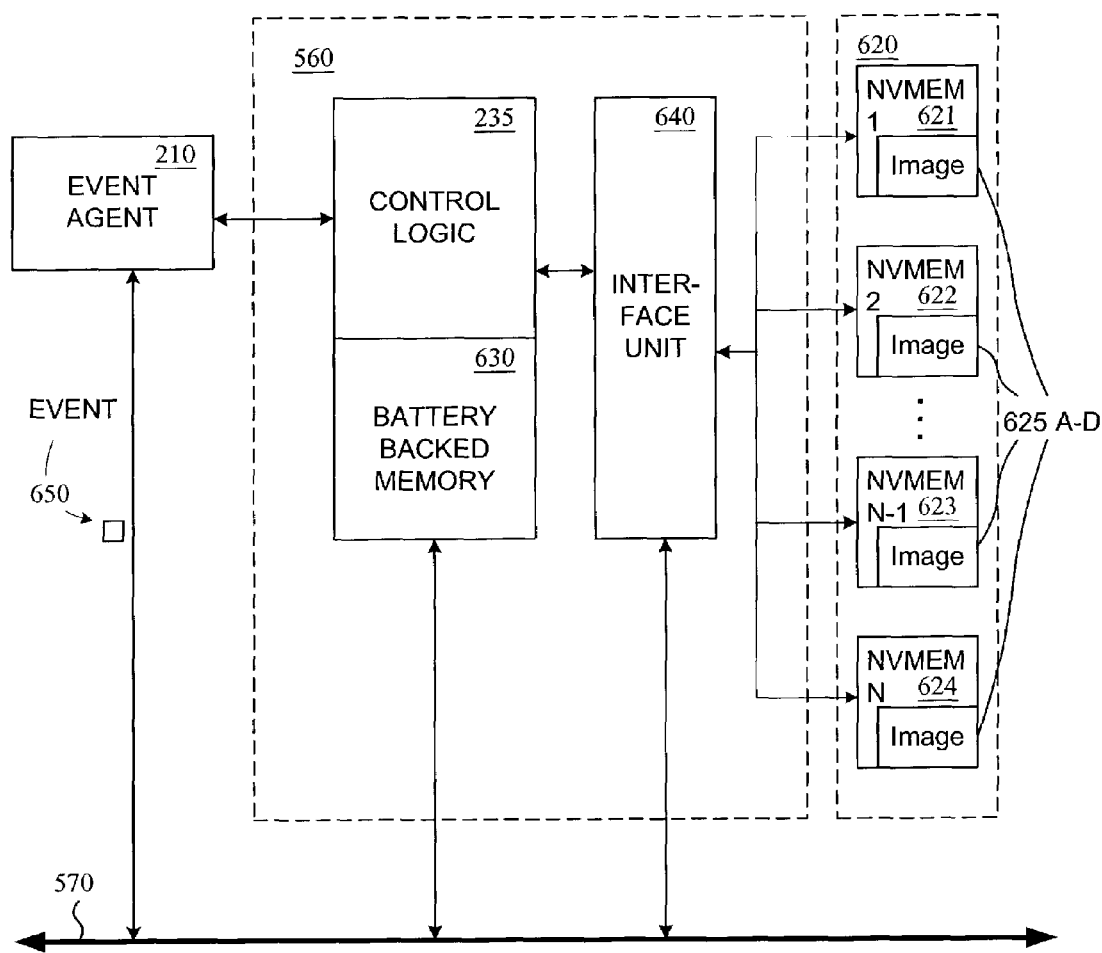
FIG. 6 is a block diagram of an embodiment of the invention 600.
Figure 7:
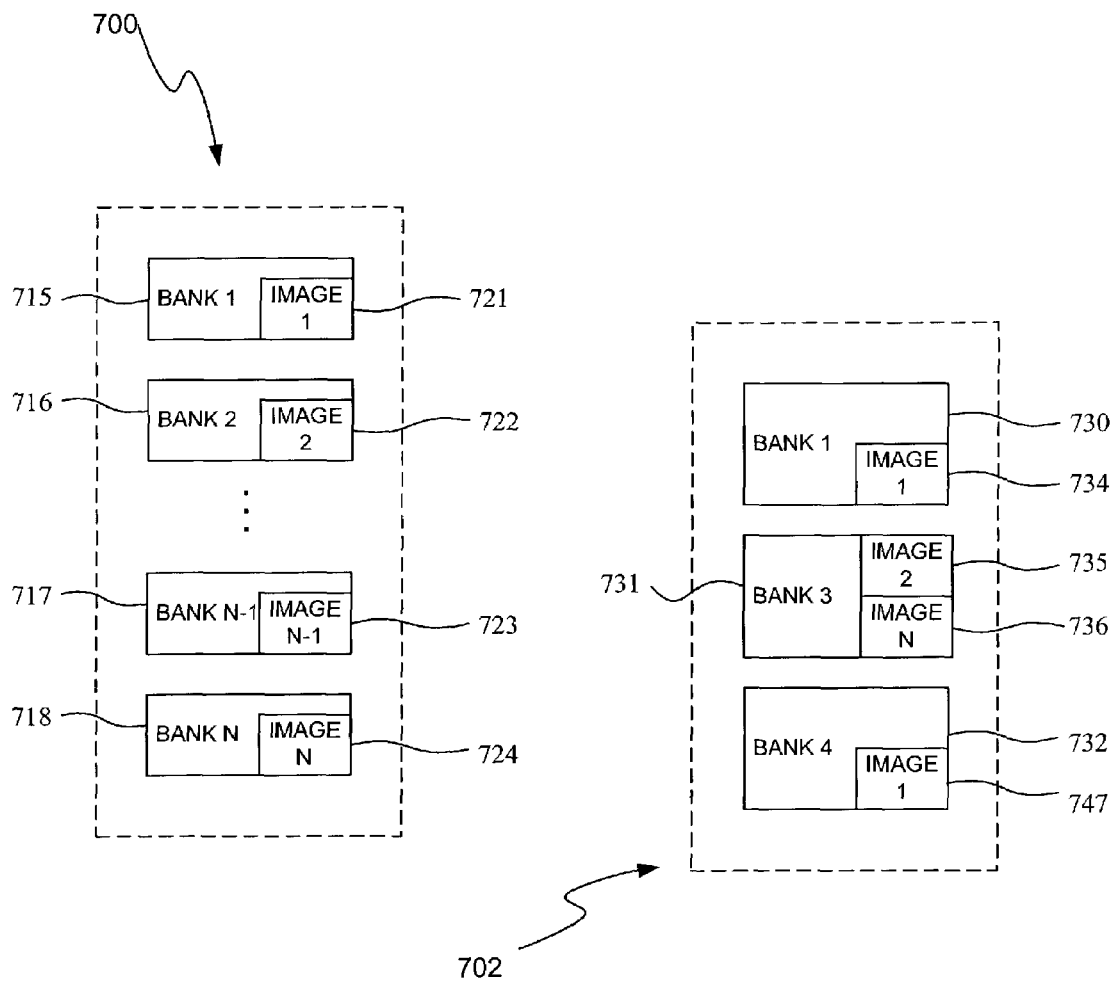
FIGS. 7A–7B are block diagrams of exemplary memory devices 700 and 702.

FIG. 6 is a block diagram of an embodiment of the invention 600. Embodiment 600 includes event agent 210, control logic 235, battery backed memory 630, interface unit 640, system interconnect 570, and array of memory devices 620. Array 620 includes non-volatile memory (NVMEM) devices 621–624. NVMEM devices 621–624 include boot images 625 A–D, respectively. Control logic 235 uses battery backed memory 630 to store one or more device select values (e.g., control bits). The device select values determine the mapping between one or more device requests and device selects used to access NVMEM devices 621–624. For example, when control logic 235 receives a device request via system interconnect 570, it selects one of the NVMEM devices 621–624 based on the current value of the device select value.

Event agent 210 alerts control logic 235 when event 650 occurs. Event 650 includes device failures, data corruption, changes in system configuration, user-initiated events, and other events for which booting or rebooting a computing system is desirable. Event agent 210 may include a watchdog thread, a hardware timer, diagnostic agents, management agents, or the like. In some embodiments of the invention, event agent 210 is a series of software instructions that perform logic operations. In alternate embodiments of the invention, event agent 210 is implemented in hardware control logic or a combination of hardware control logic and software instructions.

Event agent 210 may be connected to control logic 235 in a variety of ways. In one embodiment of the invention, event agent 210 and control logic 235 are both connected to system interconnect 570. In alternate embodiments of the invention, event agent 210 is part of interface unit 640. In yet other embodiments of the invention, event agent 210 is directly connected to control logic 235. Since events 650 may be detected in many different ways, event agent 210 may connect to control logic 235 in a number of different ways.

Array of memory devices 620 includes one or more memory devices (e.g., NVMEM devices 621–624) logically connected to control logic 235. NVMEM devices 621–624 may include various forms of non-volatile such as NVRAM, flash memory, EPROM, EEPROM, and other similar memory devices. In some embodiments of the invention, NVMEM devices 621–624 are physically and logically separate memory devices. There is no requirement that NVMEM devices 621–624 be the same kind of memory device. FIGS. 7A–7B illustrate various memory configurations that are suitable for use with embodiments of the invention.

FIG. 7A shows memory device 700 consisting of any number (N) of banks, including banks 715–718. The number of banks in memory device 700 may vary, depending on several factors, such as the type of memory device, the speed of the memory, power consumption, the amount of storage space in the memory device, bank size and other factors. For example, in one embodiment of the invention, each bank 715–718 in memory device 700 is 64 Kilobytes (KB). In alternate embodiments of the invention, banks 715–718 may be smaller than 64 KB (e.g., 4 KB or 16 KB) or larger than 64 KB (e.g., 256 KB, 128 KB, 2 Megabytes, or 8 Gigabytes). The bank size may vary throughout the same device. For example, bank 715 in memory device 700 may store 128 KB of data, while bank 716 may only store 64 KB.

FIG. 7B is a block diagram of memory device 702 comprising banks 730–732 which, in turn, comprise images 734–737. In one embodiment of the invention, images 734–737 are boot images. In alternate embodiments of the invention, one or more of images 734–737 may include non-bootable information. Non-bootable information includes instructions, data, and other system information that is not necessary for a boot process. For example, in one embodiment of the invention, the non-bootable information may include non-bootable operating system data, application programming interfaces (API), password information, and other information.

As illustrated at reference numeral 731, a bank, e.g., bank 731, may store more than one image (e.g., images 735–736). An image may span two or more banks in a memory device, in an embodiment of the invention. Also, an image may span two or more memory devices (e.g., in a Redundant Array of Independent Disks or mirrored environment). In some embodiments of the invention, a primary boot image is stored in one bank (e.g., bank 730) and a "golden" image of the primary boot image is stored in another bank (e.g., bank 732). A golden image is a functional duplicate or replica of the primary boot image. Some embodiments of the invention include a boot image, e.g., image 722, which contains error handling and diagnostic code that boots the system into a safe state and thereby prevents further degradation of the computing device employing the embodiment of the invention.

Figure 8:
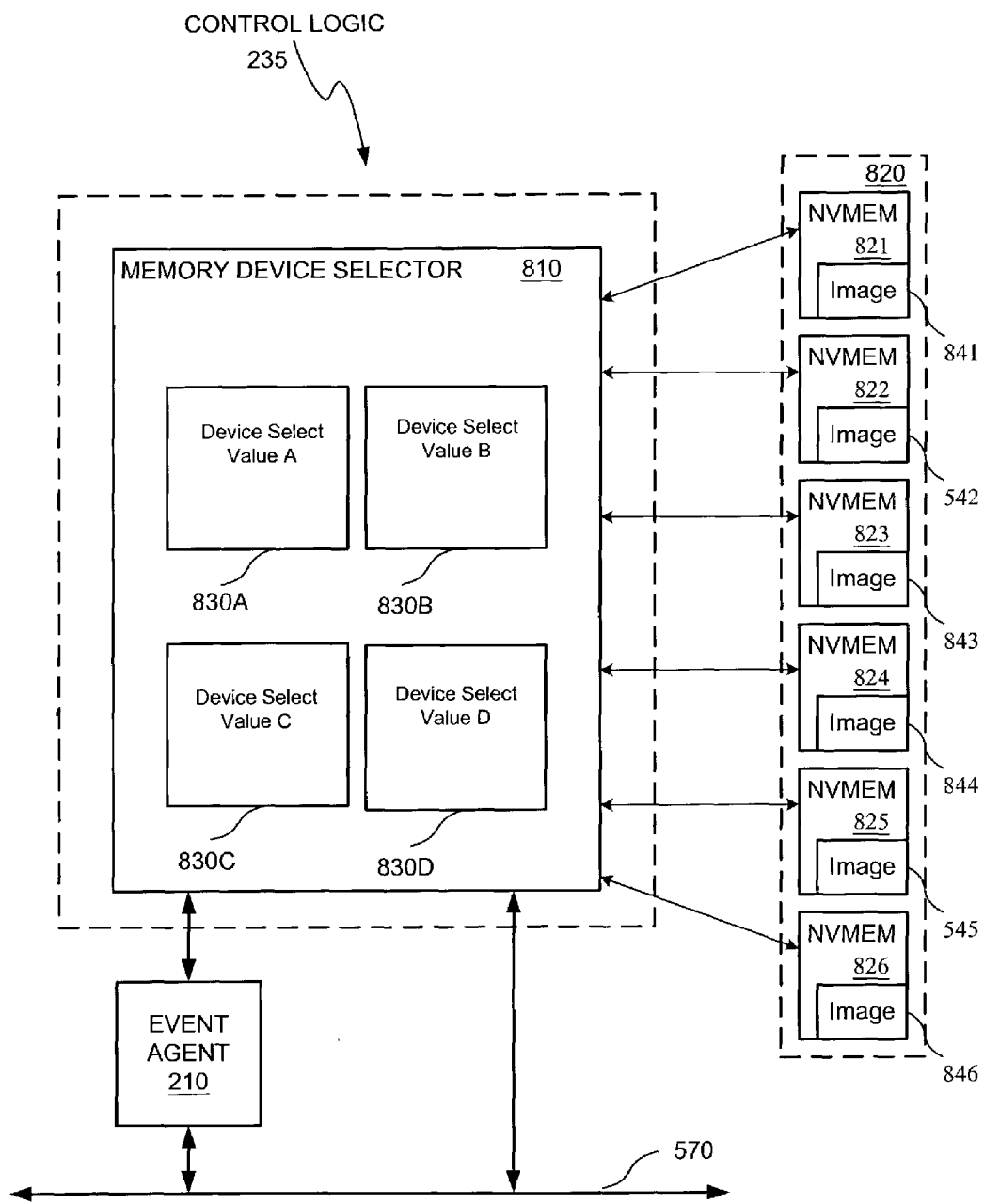
FIG. 8 is a block diagram of an embodiment of certain aspects of the invention including control logic 235, event agent 210, and memory array 820.

FIG. 8 is a block diagram of an embodiment of certain aspects of the invention including control logic 235, event agent 210, and memory array 820. Control logic 235 includes memory device selector 810, in an embodiment of the invention. Memory device selector 810 includes device select values 830A–830D. Memory device selector 810 preserves device select values 830A–830D through a reset.

Preserving device select values through a reset can be implemented with a number technologies including battery backed memory and non-volatile memory. Device select values 830A–830D can be implemented in many ways including control bits, counter values, shift registers, light emitting diodes (LED), and other digital indicator devices.

Embodiment 800 illustrates an embodiment of the invention in which the mapping between device requests and device selects is variable for some memory devices and constant for other memory devices. Control logic 235 is logically connected to array of memory devices 820 that includes NVMEM devices 821–826. Memory device selector 810 receives device requests from system interconnect 570. For example memory device selector 810 may receive device requests Range_A through Range_F. The mapping from device requests for Range_A through Range_D depends on the value of device select values 830A–D. For Range_E and Range_F, however, memory device selector 810 will always select NVMEMs 825 and 826, respectively. While FIG. 8 shows six memory devices, four of which depend on device select values 830A–D and two of which always map to the same device request, a person of ordinary skill in the art will recognize that any combination of variably and invariably selected memory devices can be implemented.

Figure 9:
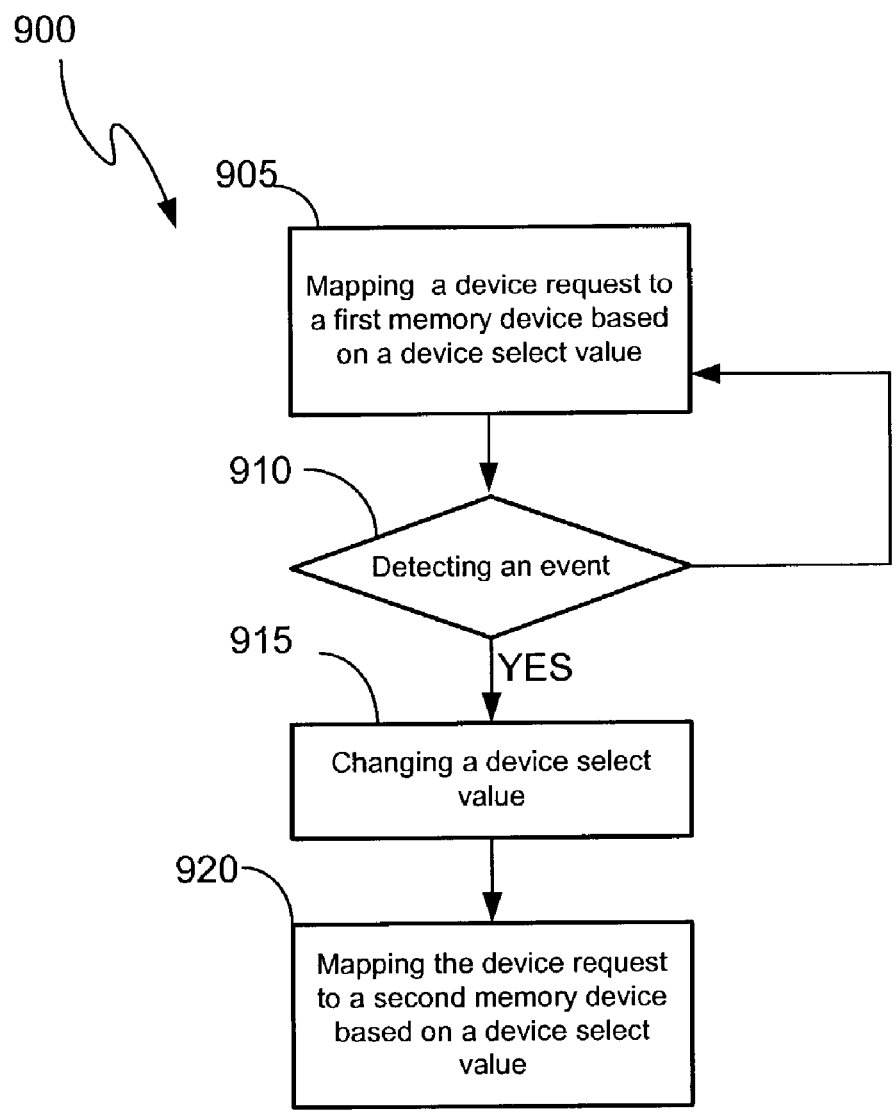
FIG. 9 is a flow diagram illustrating certain aspects of a method for accessing multiple images in a computing device.
Figure 10:
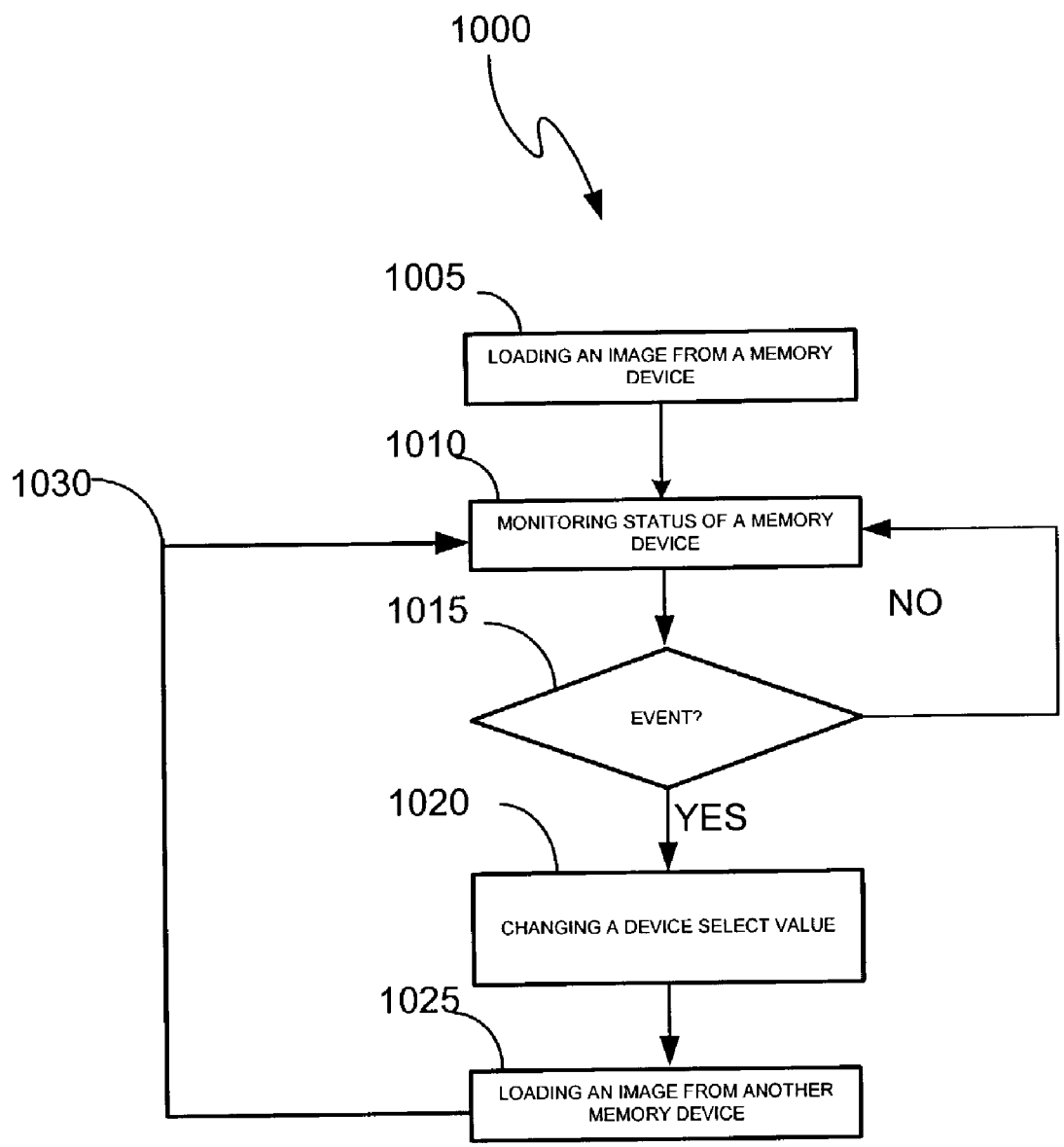
FIG. 10 is a flow diagram illustrating certain aspects of a method for monitoring memory devices and accessing boot images based on the status of memory devices, according to an embodiment of the invention.

Turning now to FIGS. 9–10, the particular methods of the invention are described in terms of computer software and hardware with reference to a series of flowcharts. The methods to be performed by a multiple boot image system constitute state machines or computer programs made up of computer-executable instructions. Describing the methods by reference to a flowchart enables one of ordinary skill in the art to develop such programs including such instructions to carry out the methods on suitably configured computing devices (the processor of the computing device executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 9 is a flow diagram illustrating certain aspects of a method for accessing multiple images in a computing device. Referring to process block 905, in one embodiment of the invention, a device request is mapped to a first memory device based on a device select value. An agent (e.g., event agent 210) monitors the status of the computing device to detect an event. If an event is detected, the device select value is changed in process block 915. For example, a watchdog agent or a system management utility may detect data corruption in the first memory device which stores the primary boot image. In one embodiment of the invention, the watchdog agent resets the computing device and automatically changes the device select value. The device request is mapped to a second memory device in process block 920. This method may be repeated until the computing device reaches a functional state, goes into a safe state, or becomes inaccessible.

FIG. 10 is a flow diagram illustrating certain aspects of a method for monitoring memory devices and accessing boot images based on the status of memory devices, according to an embodiment of the invention. A computing device begins loading a boot image from a memory device at process block 1005. An agent monitors the status of the memory device at process block 1010. The agent detects an event at process black 1015. For example, in one embodiment of the invention the agent detects that the boot image being loaded from the memory device is corrupted. A device select value is changed at process block 1020. The new device select value is used to select another boot image residing in a different memory device at 1025. Reference number 1030 indicates this method may be repeated a number of times to allow the computing device to attempt to load a boot image from a number of memory devices.

The foregoing description and drawings include references to details by way of example and explanation in describing various embodiments of the invention. These details should not be interpreted as limiting the scope of the invention, which is subsequently set forth in the claims. One skilled in the art will appreciate that not all possible embodiments of the invention have been presented, but many alterations and/or modifications could be made without departing from the broader spirit and scope of the invention.

What is claimed is:

1. An apparatus comprising:
a first memory device to store bootable information;
a second memory device to store bootable information
control logic to store a device select value and to map a device request to one of the first or second memory devices based, at least in part, on the device select value, wherein the device select value is to specify a mapping between a fixed memory address and a device select and further wherein the device select value is to change responsive to an alert from an event agent; and
the event agent coupled with the control logic, the event agent to monitor a status of at least one of the first memory device and the second memory device and to alert the control logic if an event is detected.

2. The apparatus of claim 1, further comprising a third memory device to store data.

3. The apparatus of claim 2, further comprising an event agent to detect an event.

4. The apparatus of claim 3, wherein the control logic to store the device select value further comprises non-volatile memory to preserve the device select value through a reset.

5. The apparatus of claim 3, wherein the control logic to store the device select value further comprises a battery backed memory to preserve the device select value through a reset.

6. The apparatus of claim 5, wherein the control logic changes the device select value when the event agent detects an event.

7. The apparatus of claim 6, wherein the control logic maps the device request to one of the first or second memory devices based, at least in part, on the device select value.

8. The apparatus of claim 7, wherein the control logic changes the device select value to a predetermined value, when the event agent detects an event.

9. The apparatus of claim 7, wherein the control logic maps another device request to the third memory device independent of the device select value.

10. The apparatus of claim 7, wherein the first, second, and third memory devices are non-volatile memory devices.

11. The apparatus of claim 10, wherein the event agent comprises a watchdog process.

12. The apparatus of claim 1, wherein the bootable information stored in the second memory device is a duplicate of the bootable information stored in the first memory device.

* * * * *